(12) United States Patent
Liao et al.

(10) Patent No.: US 12,441,835 B2
(45) Date of Patent: Oct. 14, 2025

(54) METHOD FOR PRODUCING POLYESTER POLYOL

(71) Applicant: NAN YA PLASTICS CORPORATION, Taipei (TW)

(72) Inventors: Te-Chao Liao, Taipei (TW); Han-Ching Hsu, Taipei (TW); Chen-Wei Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 577 days.

(21) Appl. No.: 18/071,807

(22) Filed: Nov. 30, 2022

(65) Prior Publication Data
US 2024/0124643 A1 Apr. 18, 2024

(30) Foreign Application Priority Data
Oct. 14, 2022 (TW) ................... 111138927

(51) Int. Cl.
*C08G 63/40* (2006.01)
*C08G 63/16* (2006.01)
(Continued)

(52) U.S. Cl.
CPC .......... *C08G 63/40* (2013.01); *C08G 63/183* (2013.01); *C08G 63/85* (2013.01); *C08G 63/16* (2013.01); *C08G 63/78* (2013.01); *C08G 63/80* (2013.01)

(58) Field of Classification Search
None
See application file for complete search history.

(56) References Cited

U.S. PATENT DOCUMENTS

| 4,052,368 A | 10/1977 | Larson |
| 2012/0258269 A1* | 10/2012 | Gehringer ............ C08G 18/664 560/182 |

(Continued)

FOREIGN PATENT DOCUMENTS

| CN | 111101227 A | 5/2020 |
| CN | 113549205 A | 10/2021 |

(Continued)

OTHER PUBLICATIONS

Wu et al (CN 111101227 A) English Machine Translation (Year: 2025).*

(Continued)

*Primary Examiner* — Randy P Gulakowski
*Assistant Examiner* — Holley Grace Hester
(74) *Attorney, Agent, or Firm* — Li & Cai Intellectual Property (USA) Office

(57) ABSTRACT

A method for producing a polyester polyol is provided, which includes: feeding a first antioxidant and a raw material reactant that includes a polyacid and a polyol into a reactor; subjecting the polyacid and the polyol to an esterification reaction to form an oligomer; and performing a prepolymerization reaction on the oligomer to obtain a prepolymerization reactant. During the prepolymerization reaction, the method includes sampling and monitoring an acid value of the prepolymerization reactant. When the acid value of the prepolymerization reactant reaches a first acid value, an esterification reaction catalyst is added to the prepolymerization reactant for carrying out a polycondensation reaction and generating a polycondensation reactant that contains the polyester polyol. During the polycondensation reaction, the method includes sampling and monitoring an acid value of the polycondensation reactant. When the (Continued)

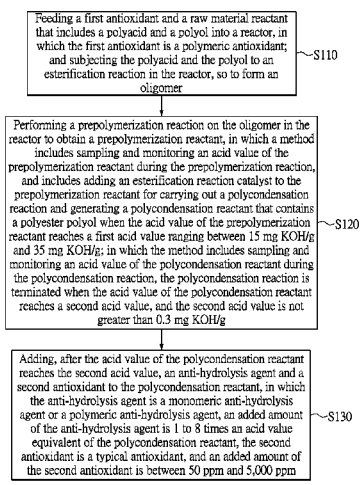

acid value of the polycondensation reactant reaches a second acid value, the polycondensation reaction is terminated.

10 Claims, 1 Drawing Sheet

(51) Int. Cl.
*C08G 63/183* (2006.01)
*C08G 63/78* (2006.01)
*C08G 63/80* (2006.01)
*C08G 63/85* (2006.01)

(56) References Cited

U.S. PATENT DOCUMENTS

| | | |
|---|---|---|
| 2015/0183927 A1 | 7/2015 | Kang et al. |
| 2022/0056201 A1 | 2/2022 | Liao et al. |

FOREIGN PATENT DOCUMENTS

| | | | | |
|---|---|---|---|---|
| CN | 113929888 A | * | 1/2022 | ............. C08K 5/524 |
| JP | 52155640 A | | 12/1977 | |
| JP | 2015530435 A | | 10/2015 | |
| TW | 202124508 A | | 7/2021 | |
| TW | 202208496 A | | 3/2022 | |

OTHER PUBLICATIONS

Zhao et al (CN 113929888 A) English Machine Translation (Year: 2025).*

Lin et al (TW 1739238 B) English Machine Translation (Year: 2025).*

* cited by examiner

```
┌─────────────────────────────────────────────────┐
│ Feeding a first antioxidant and a raw material  │
│ reactant that includes a polyacid and a polyol  │
│ into a reactor, in which the first antioxidant  │
│ is a polymeric antioxidant; and subjecting the  │──S110
│ polyacid and the polyol to an esterification    │
│ reaction in the reactor, so to form an oligomer │
└─────────────────────────────────────────────────┘
                        │
                        ▼
┌─────────────────────────────────────────────────┐
│ Performing a prepolymerization reaction on the  │
│ oligomer in the reactor to obtain a             │
│ prepolymerization reactant, in which a method   │
│ includes sampling and monitoring an acid value  │
│ of the prepolymerization reactant during the    │
│ prepolymerization reaction, and includes adding │
│ an esterification reaction catalyst to the      │
│ prepolymerization reactant for carrying out a   │
│ polycondensation reaction and generating a      │
│ polycondensation reactant that contains a       │──S120
│ polyester polyol when the acid value of the     │
│ prepolymerization reactant reaches a first acid │
│ value ranging between 15 mg KOH/g and 35 mg     │
│ KOH/g; in which the method includes sampling    │
│ and monitoring an acid value of the             │
│ polycondensation reactant during the            │
│ polycondensation reaction, the polycondensation │
│ reaction is terminated when the acid value of   │
│ the polycondensation reactant reaches a second  │
│ acid value, and the second acid value is not    │
│ greater than 0.3 mg KOH/g                       │
└─────────────────────────────────────────────────┘
                        │
                        ▼
┌─────────────────────────────────────────────────┐
│ Adding, after the acid value of the             │
│ polycondensation reactant reaches the second    │
│ acid value, an anti-hydrolysis agent and a      │
│ second antioxidant to the polycondensation      │
│ reactant, in which the anti-hydrolysis agent is │
│ a monomeric anti-hydrolysis agent or a          │
│ polymeric anti-hydrolysis agent, an added       │──S130
│ amount of the anti-hydrolysis agent is 1 to 8   │
│ times an acid value equivalent of the           │
│ polycondensation reactant, the second           │
│ antioxidant is a typical antioxidant, and an    │
│ added amount of the second antioxidant is       │
│ between 50 ppm and 5,000 ppm                    │
└─────────────────────────────────────────────────┘
```

METHOD FOR PRODUCING POLYESTER POLYOL

CROSS-REFERENCE TO RELATED PATENT APPLICATION

This application claims the benefit of priority to Taiwan Patent Application No. 111138927, filed on Oct. 14, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for producing a polyester polyol, and more particularly to a method for producing a polyester polyol in which a hydrolysis resistance of the finally-formed polyester polyol can be improved.

BACKGROUND OF THE DISCLOSURE

A typical polyester polyol has an ester group in its chemical structure. Hence, after storage or exposure to air for a period of time, the typical polyester polyol is prone to hydrolysis due to absorption of moisture, thereby affecting a material quality. In addition, when an adhesive tape of a thermoplastic polyurethane resin produced from the typical polyester polyol is used for laminating a product, a molecular weight reduction and a yellowing issue are very likely to occur due to degradation of the polyester polyol, such that a service life of the product is negatively affected.

Conventionally, a high synthesis temperature and a long polycondensation time are required during a preparation process of the typical polyester polyol having a high acid value. As a result, the hue of such a material is prone to yellowing at a high temperature. In addition, the material has a disadvantage of unstable reactivity when being used in the production of the thermoplastic polyurethane resin. When the thermoplastic polyurethane resin is used in the lamination of products such as a shoe material or fabric, hydrolysis is likely to occur, thereby affecting the service life of the product.

SUMMARY OF THE DISCLOSURE

In response to the above-referenced technical inadequacies, the present disclosure provides a method for producing a polyester polyol, in which a hydrolysis resistance of the finally-formed polyester polyol can be improved.

In one aspect, the present disclosure provides a method for producing a polyester polyol. The method includes: feeding a first antioxidant and a raw material reactant that includes a polyacid and a polyol into a reactor; subjecting the polyacid and the polyol to an esterification reaction in the reactor, so as to form an oligomer; and performing a prepolymerization reaction on the oligomer in the reactor, so as to obtain a prepolymerization reactant. The first antioxidant is a polymeric antioxidant having a molecular weight of not less than 1,000 g/mol. During the prepolymerization reaction, the method includes sampling and monitoring an acid value of the prepolymerization reactant. When the acid value of the prepolymerization reactant reaches a first acid value, the method includes adding an esterification reaction catalyst to the prepolymerization reactant, so as to start a polycondensation reaction and generate a polycondensation reactant that contains the polyester polyol. The first acid value is between 15 mg KOH/g and 35 mg KOH/g. During the polycondensation reaction, the method includes sampling and monitoring an acid value of the polycondensation reactant. When the acid value of the polycondensation reactant reaches a second acid value, the polycondensation reaction is terminated. The second acid value is not greater than 0.3 mg KOH/g.

Preferably, the method further includes: adding, after the acid value of the polycondensation reactant reaches the second acid value, an anti-hydrolysis agent and a second antioxidant to the polycondensation reactant. The anti-hydrolysis agent is a monomeric anti-hydrolysis agent or a polymeric anti-hydrolysis agent, and an added amount of the anti-hydrolysis agent is between 1 times and 8 times an acid value equivalent of the polycondensation reactant. The second antioxidant is a typical antioxidant having a molecular weight of not greater than 1,000 g/mol, and an added amount of the second antioxidant is between 50 ppm and 5,000 ppm (parts per million).

Preferably, in the esterification reaction, the polyacid and the polyol carry out an oligomerization reaction at a first reaction temperature and at a first reaction pressure. The first reaction temperature is between 140° C. and 230° C., and the first reaction pressure is between 740 torr and 780 torr.

Preferably, the prepolymerization reaction is carried out under conditions that gas pumping and pressure reduction are performed on the reactor by a vacuum pump, such that a gas pressure in the reactor is reduced from the first reaction pressure to a second reaction pressure. The prepolymerization reaction is carried out by heating to a second reaction temperature. The second reaction temperature is between 200° C. and 250° C., and the second reaction pressure is between 20 torr and 70 torr.

Preferably, a stirrer is disposed in the reactor to stir the polyacid and the polyol. A top portion of the reactor is in spatial communication with a separation column, a condensing pipe that is in communication with an inside of the reactor is disposed at a tower top of the separation column, and a separation column top temperature of the tower top of the separation column is controlled to be within a temperature range between 95° C. and 105° C., such that a separated substance that is separated by the separation column and refluxed from the tower top is controlled to have a temperature within said temperature range.

Preferably, when an esterification rate of the esterification reaction is between 80% and 90%, the esterification reaction is terminated to complete preparation of the oligomer, and the oligomer is prepared to enter the subsequent prepolymerization reaction.

Preferably, the polycondensation reaction further includes performing a dealcoholization operation on the polycondensation reactant at a dealcoholization pressure between 5 torr and 30 torr, so as to remove redundant polyol reaction monomers in the polycondensation reactant.

Preferably, the anti-hydrolysis agent and the second antioxidant are added under a condition that the polycondensation reactant is reduced to a cooling temperature that is between 90° C. and 120° C.

Preferably, the anti-hydrolysis agent is added to the polycondensation reactant before the second antioxidant is added to the polycondensation reactant. Preferably, the anti-hydrolysis agent includes a monomeric anti-hydrolysis agent that is side-modified with a long carbon chain, and the long carbon chain has a carbon chain length between C8 and C18.

Therefore, in the method for producing the polyester polyol provided by the present disclosure, by virtue of "feeding a first antioxidant and a raw material reactant that includes a polyacid and a polyol into a reactor, in which the first antioxidant is a polymeric antioxidant having a molecular weight of not less than 1,000 g/mol; subjecting the polyacid and the polyol to an esterification reaction in the reactor, so as to form an oligomer; and performing a prepolymerization reaction on the oligomer in the reactor, so as to obtain a prepolymerization reactant," "during the prepolymerization reaction, the method including sampling and monitoring an acid value of the prepolymerization reactant," "when the acid value of the prepolymerization reactant reaches a first acid value, the method including adding an esterification reaction catalyst to the prepolymerization reactant, so as to start a polycondensation reaction and generate a polycondensation reactant that contains the polyester polyol, in which the first acid value is between 15 mg KOH/g and 35 mg KOH/g," "during the polycondensation reaction, the method including sampling and monitoring an acid value of the polycondensation reactant," and "when the acid value of the polycondensation reactant reaches a second acid value, the polycondensation reaction being terminated, in which the second acid value is not greater than 0.3 mg KOH/g," the finally-formed polyester polyol can have an improved hydrolysis resistance. Accordingly, a molecular weight reduction and the occurrence of yellowing (which may negatively affect a service life of a product) can be effectively prevented.

On the whole, the method provided by the present disclosure optimizes a raw material formula (which includes the addition of the anti-hydrolysis agent and the antioxidant) and manufacturing parameters, such that a polyester polyol having characteristics of a low acid value, a low hue, a high-temperature resistance, a yellowing resistance and a hydrolysis resistance can be generated. When the polyester polyol generated by the present disclosure is used for producing a thermoplastic polyurethane resin, the thermoplastic polyurethane resin can have a good reactivity. As such, by applying the thermoplastic polyurethane resin to product lamination (e.g., laminating a shoe material or fabric), the durability of the product can be significantly enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for producing a polyester polyol according to one embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Producing Polyester Polyol]

As shown in FIG. 1, one embodiment of the present disclosure provides a method for producing a polyester polyol. The method includes step S110, step S120 and step S130. It should be noted that, a sequence and actual operation of the steps described in the embodiments of the present disclosure can be adjusted as necessary and are not limited to those described in the embodiments.

The method for producing the polyester polyol in the embodiments of the present disclosure may include additional operations before, between or after the steps. Further, some operations described may be substituted, eliminated or rearranged for realizing additional ways to implement the method.

Step S110 includes: feeding a raw material reactant into a reactor. The raw material reactant includes a polyacid and a polyol.

In some implementations of the present disclosure, the polyacid can be, for example, at least one material selected from a group consisting of adipic acid, terephthalic acid, phthalic acid, isophthalic acid, sebacic acid and derivatives thereof. That is to say, the polyacid is preferably a diacid.

In some implementations of the present disclosure, the polyol can be, for example, at least one material selected from a group consisting of ethylene glycol, di-ethylene glycol, tri-ethylene glycol, 1,3-propanediol, 2-methyl-1,3-propanediol, 1,4-butanediol, pentylene glycol, neo pentyl glycol, 3-methyl-1,5-pentanediol, hexylene glycol, 1,4-cyclo-hexane-dimethanol, glycerol, 2,2-bis(hydroxymethyl)-1,3-propanediol, sorbitol and derivatives thereof.

Step S110 further includes: subjecting the polyacid and the polyol to an esterification reaction in the reactor, such that the polyacid and the polyol are formed into an oligomer. That is to say, the esterification reaction can be, for example, an oligomerization reaction. It should be noted that, the "oligomerization reaction" mentioned herein refers to the polyacid and the polyol carrying out a preliminary polymerization, so as to form the oligomer (e.g., a dimer, a trimer and/or a tetramer).

In terms of reaction conditions, the esterification reaction can be, for example, having the polyacid and the polyol react at a first reaction temperature and at a first reaction pressure. In the embodiments of the present disclosure, the first reaction temperature can be, for example, between 140° C. and 230° C., and the first reaction pressure can be, for example, an atmospheric pressure between about 740 torr and 780 torr, but the present disclosure is not limited thereto.

In one embodiment of the present disclosure, a stirrer is disposed in the reactor to uniformly stir the polyacid and the polyol in the raw material reactant. Further, a top portion of the reactor is in spatial communication with a separation column. A condensing pipe that is in communication with a fluid (e.g., the raw material reactant or a reaction product) inside the reactor is disposed at a tower top of the separation column. In this way, substances (e.g., the polyol) separated from the tower top of the separation column can reflux into the reactor upon condensation, thereby effectively reducing a used amount of the reactant.

Specifically, the polyacid and the polyol will carry out the esterification reaction in the reactor, and a byproduct (water) of the esterification reaction is generated. In order to avoid a hydrolysis reaction, the byproduct (water) will be discharged through the separation column. As such, the oligomerization reaction is not affected. In addition, after being separated by the separation column, the polyol will reflux into the reactor upon condensation, so as to continue the esterification reaction (oligomerization reaction) with the polyacid.

Further, in order to enable the finally-formed polyester polyol to have a low acid value, in one embodiment of the present disclosure, a separation column top temperature of the tower top of the separation column is controlled to be within a temperature range between 95° C. and 105° C. (preferably between 100° C. and 102° C.), such that the substances (e.g., the polyol) separated by the separation column and refluxed from the tower top can be controlled to have a temperature within the abovementioned temperature range. Therefore, by precisely controlling the separation column top temperature to be within the abovementioned temperature range, loss of diol during the reaction process can be effectively reduced, so that an alcohol/acid ratio can be precisely controlled. Moreover, a molecular weight and the quality of a finally-formed polyester polyol product can be guaranteed.

In one embodiment of the present disclosure, when an esterification rate of the polyacid and the polyol is between 80% and 90% (preferably between 82% and 85%) due to the esterification reaction, the esterification reaction is terminated to complete preparation of the oligomer, and the oligomer is prepared to enter a subsequent prepolymerization reaction. It is worth mentioning that, through controlling the esterification rate, a subsequent polycondensation reaction can be quickly and effectively carried out, so as to maintain a balance between an acid value and an OH value. It should be noted that the "esterification rate" of the oligomer referred herein can be calculated from the acid value and a saponification value by Formula (1). The acid value is obtained by dissolving the oligomer in dimethylformamide and through a titration process with use of 0.1 N of a KOH/methanol solution. The saponification value is obtained by hydrolyzing the oligomer in 0.5 N of a KOH/ethanol solution and through the titration process with use of 0.5 N of hydrochloric acid.

$$\text{Esterification rate (\%)} = ((\text{saponification value} - \text{acid value})/\text{saponification value})*100 \quad \text{Formula (1)}.$$

In one embodiment of the present disclosure, step S110 further includes: adding a first antioxidant to the raw material reactant. The first antioxidant is a polymeric antioxidant. A number-average molecular weight of the polymeric antioxidant is not less than 1,000 g/mol, and is preferably between 1,500 g/mol and 2,500 g/mol. The first antioxidant is added to the raw material reactant before the esterification reaction, and its added amount is between 50 ppm and 300 ppm. The first antioxidant can stabilize the reactivity of the esterification reaction, improve a hue of the final reaction product (polyester polyol), and reduce generation of the reaction byproduct (water).

In terms of material type, the polymeric antioxidant can be, for example, at least one material selected from a group consisting of a hindered phenol-based antioxidant and a phosphite-based antioxidant. In one implementation of the present disclosure, the abovementioned two types of the polymeric antioxidant (in a total amount of from 50 ppm to 300 ppm) may be used alone or as a mixture at a certain ratio (e.g., a ratio of hindered phenol to phosphite being between 5/1 and 1/1).

In some implementations of the present disclosure, in the raw material reactant, a ratio (alcohol/acid ratio) of an alcohol group molar number in the polyol to an acid group molar number in the polyacid is between 1.005 and 1.4, and is preferably between 1.015 and 1.25.

Step S120 includes: performing the prepolymerization reaction on the oligomer in the reactor, so as to obtain a prepolymerization reactant. The prepolymerization reaction is carried out under conditions that gas pumping and pressure reduction are performed on the reactor by a vacuum pump, such that a gas pressure in the reactor is reduced from the first reaction pressure (e.g., the atmospheric pressure) to a second reaction pressure.

In one embodiment of the present disclosure, the second reaction pressure upon vacuum pressure reduction is between 20 torr and 70 torr, and is preferably between 20 torr and 50 torr (lower than 740 torr to 780 torr of the first reaction pressure). The prepolymerization reaction is performed by heating to a second reaction temperature between 200° C. and 250° C. (higher than 140° C. to 230° C. of the first reaction temperature). However, the present disclosure is not limited thereto.

In addition, step S120 further includes: sampling and monitoring an acid value of the prepolymerization reactant during the prepolymerization reaction, and adding an esterification reaction catalyst to the prepolymerization reactant when the acid value of the prepolymerization reactant reaches a first acid value, so as to start the polycondensation reaction and generate a polycondensation reactant. An added amount of the esterification reaction catalyst is from 0.01 wt % to 0.05 wt %.

The "polycondensation reaction" refers to a reaction where the prepolymerization reactant undergoes the esterification reaction through a terminal acid group and a terminal alcohol group for a further serial connection. The first acid value is between 15 mg KOH/g and 35 mg KOH/g, and is preferably between 20 mg KOH/g and 30 mg KOH/g. A technical effect of adding the esterification reaction catalyst at the first acid value is that the OH value can be guaranteed to be within a reasonable range, so that the molecular weight, a molecular weight distribution and a viscosity of a finished product conform to the regulations. If the catalyst is added outside the abovementioned range of the acid value, the diol is likely to be distilled out before the reaction is finished, thereby resulting in the acid value of the finished product being high, or the finished product having a qualified acid value but a low OH value. It should be noted that the "acid value" referred herein is the number of milligrams of potassium hydroxide (KOH) required to neutralize 1 gram of oil. The acid value is a measurement standard for the number of free carboxylic acid groups in a compound (e.g., a fatty acid) or a mixture. A standard measurement procedure includes dissolving a known amount of a sample in an organic solvent, and titrating with a known concentration of a potassium hydroxide solution, in which a phenolphthalein solution is used as a color indicator.

Further, the esterification reaction catalyst can be, for example, an organotitanium catalyst or an organotin catalyst.

More specifically, the organotitanium catalyst can be, for example, at least one of tetrabutyl titanium, tetramethyl titanate, tetraethyl titanate, tetrapropyl titanate, tetraisopropyl titanate and tetrabutyl titanate.

In addition, the organotin catalyst can be, for example, at least one of tetrabutyltin, stannous octoate, di-n-butyltin oxide and monobutyltin oxide.

More specifically, step S120 further includes: sampling and monitoring an acid value of the polycondensation reactant during the polycondensation reaction, and terminating the polycondensation reaction when the acid value of the polycondensation reactant reaches a second acid value. Then, the reactor is subjected to vacuum breaking, and a temperature of the polycondensation reactant is reduced. The second acid value is not greater than 0.3 mg KOH/g, and is preferably not greater than 0.1 mg KOH/g. Therefore, the finished product of polyester polyol can have an excellent hydrolysis resistance, and can achieve an excellent reactivity.

In one embodiment of the present disclosure, the polycondensation reaction further includes performing a dealcoholization operation on the polycondensation reactant at a dealcoholization pressure between 5 torr and 30 torr, so as to remove redundant polyol reaction monomers in the polycondensation reactant, but the present disclosure is not limited thereto. It is worth mentioning that in the embodiments of the present disclosure, the polycondensation reactant generated in step S120 mainly includes the polyester polyol, which is the main product from the polycondensation reaction.

A duration of the polycondensation reaction is positively correlated with the molecular weight of the polyester polyol. In some implementations of the present disclosure, the duration of the polycondensation reaction ranges from 60 min to 240 min, and preferably ranges from 120 min to 180 min. A number-average molecular weight of the polyester polyol product is between 600 g/mol and 4,000 g/mol, and is preferably between 2,000 g/mol and 3,500 g/mol. However, the present disclosure is not limited thereto.

Step S130 includes: adding, after the acid value of the polycondensation reactant reaches the second acid value, an anti-hydrolysis agent and a second antioxidant to the polycondensation reactant, so as to suppress an increase of the acid value of the polycondensation reactant.

The anti-hydrolysis agent and the second antioxidant are added under a condition that the polycondensation reactant is reduced to a cooling temperature. The cooling temperature is between 90° C. and 120° C., and is preferably between 100° C. and 120° C.

In one implementation of the present disclosure, the anti-hydrolysis agent is added to the polycondensation reactant before the second antioxidant is added to the polycondensation reactant.

In terms of material type of the anti-hydrolysis agent, the anti-hydrolysis agent can be, for example, at least one of a monomeric anti-hydrolysis agent and a polymeric anti-hydrolysis agent. Moreover, the anti-hydrolysis agent can be, for example, at least one of a monomeric carbodiimide anti-hydrolysis agent and a polymeric carbodiimide anti-hydrolysis agent. It is worth mentioning that the carbodiimide anti-hydrolysis agent can react with a terminal carboxyl group of a polyester molecular chain, so as to generate a ureido compound without side effects. Accordingly, an amount of the terminal carboxyl group in a polyester material can be effectively reduced, and a polyester hydrolysis reaction can be alleviated, thereby improving a comprehensive performance and prolonging a service life of the polyester material. In a specific application of the present disclosure, the anti-hydrolysis agent is a polycarbodiimide polyurethane anti-hydrolysis agent (Stabaxol), but the present disclosure is not limited thereto.

In terms of added amount of the anti-hydrolysis agent, an amount of the anti-hydrolysis agent added to the polycondensation reactant can be, for example, between 1 times and 8 times (preferably between 2 times and 6 times) an acid value equivalent (i.e., an equivalent of the second acid value) of the polycondensation reactant. For example, in one implementation of the present disclosure, the amount of the anti-hydrolysis agent added to the polycondensation reactant is between 0.1 wt % and 2 wt %, and is preferably between 0.3 wt % and 0.8 wt %, but the present disclosure is not limited thereto. The added amount of the anti-hydrolysis agent is adjusted according to the acid value equivalent of the polycondensation reactant. Since the added amount of the anti-hydrolysis agent can guarantee the stability of the acid value at a high temperature, and the prepared polyester polyol can have a low acid value, the long-term thermal stability can be improved. In a specific calculation example, the added amount required for 100 g of the finished product (with an acid value of 0.3 mg KOH/g) is ((0.3/1,000*100 g of the sample/56.1)*molecular weight of the anti-hydrolysis agent)*2, or ((0.3/1,000*100 g of the sample/56.1)*molecular weight of the anti-hydrolysis agent)*3.

In one implementation of the present disclosure, the anti-hydrolysis agent can be, for example, a monomeric anti-hydrolysis agent modified with a side long carbon chain (which has a carbon chain length of from C8 to C18), such that the heat resistance of the finally-formed polyester polyol can be enhanced, the long-term stability of the formula can be improved, and a product can have a higher retention rate of physical properties.

In terms of material type of the antioxidant, the second antioxidant is a typical antioxidant. That is, the second antioxidant is an antioxidant having a small molecular weight (e.g., having a molecular weight of not greater than 1,000 g/mol, and preferably not greater than 800 g/mol), but the present disclosure is not limited thereto.

It should be noted that, as mentioned above, the first antioxidant and the second antioxidant are used in the embodiments of the present disclosure. The first antioxidant (polymeric antioxidant) is added to the raw material reactant before the esterification reaction. The first antioxidant can stabilize the reactivity of the esterification reaction, improve the hue of the final reaction product (polyester polyol), and reduce generation of the reaction byproduct (water).

In addition, the second antioxidant (typical antioxidant) is added after the acid value of the polycondensation reactant reaches the second acid value and the anti-hydrolysis agent is added, and the addition of the second antioxidant can reduce the occurrence of material oxidation and coloring during storage of the polyester polyol.

In terms of the added amount of the antioxidant, the amount of the second antioxidant added to the polycondensation reactant can be, for example, between 50 ppm (parts per million) and 5,000 ppm. In one exemplary implementation of the present disclosure, the amount of the second antioxidant added to the polycondensation reactant can be, for example, between 500 ppm and 3,000 ppm.

Further, in one implementation of the present disclosure, after being added to the polycondensation reactant, the anti-hydrolysis agent and the second antioxidant are continuously stirred for 1 to 2 hours. In this way, the anti-hydrolysis agent and the second antioxidant can be thoroughly mixed with the polyester polyol in the polycondensation reactant, so as to complete preparation of the final reaction product (polyester polyol).

Based on the method as described in the abovementioned embodiments, the finally-formed polyester polyol can have a low acid value, which is beneficial for the polyester polyol to have a high hydrolysis resistance. Further, the reactivity of the polyester polyol can be improved when being used in a thermoplastic polyurethane (TPU) resin.

On the whole, the method provided in the embodiments of the present disclosure optimizes a raw material formula (which includes the addition of the anti-hydrolysis agent and the antioxidant) and manufacturing parameters, such that the polyester polyol having the characteristics of a low acid value, a low hue, a high-temperature resistance, a yellowing resistance and a hydrolysis resistance can be generated. When the polyester polyol generated by the embodiments of the present disclosure is used for producing the thermoplastic polyurethane resin, the thermoplastic polyurethane resin can have a good reactivity. As such, by applying the thermoplastic polyurethane resin to product lamination (e.g., laminating a shoe material or fabric), the durability of the product can be significantly enhanced.

[Experimental Data and Experimental Results]

In order to demonstrate the technical effects of the method provided by the present disclosure, the description below is made with reference to experimental data and experimental results. However, the following examples and comparative examples are only provided to aid in understanding of the present disclosure, and are not to be construed as limiting the scope of the present disclosure.

Example 1: A raw material reactant and a first antioxidant are fed into a reactor, in which the raw material reactant includes 600 g of adipic acid (polyacid) and 440 g of 1,4-butanediol (polyol), and the first antioxidant is phosphite ester (polymeric antioxidant having a molecular weight of about 3,000) in an amount of 0.1 g. The polyacid and the polyol carry out an esterification reaction in the reactor (with a first reaction temperature being controlled between 140° C. and 200° C., and a first reaction pressure being controlled at 760 torr), so as to form an oligomer. Then, a prepolymerization reaction is performed on the oligomer (with a second reaction temperature being controlled between 200° C. and 220° C., and a second reaction pressure being controlled between 20 torr to 50 torr), so as to obtain a prepolymerization reactant. During the prepolymerization reaction, an acid value of the prepolymerization reactant is sampled and monitored. When the acid value of the prepolymerization reactant is 25 mg KOH/g (first acid value), 1.2 g of stannous octoate (esterification reaction catalyst) is added to the prepolymerization reactant for carrying out a polycondensation reaction, and generating a prepolymerization reactant that contains a polyester polyol. During the polycondensation reaction, an acid value of the polycondensation reactant is sampled and monitored. When the acid value of the polycondensation reactant is 0.1 mg KOH/g (second acid value), the polycondensation reaction is terminated. Then, carbodiimide (anti-hydrolysis agent) and 11010 (second antioxidant) are sequentially added to the polycondensation reactant, in which an added amount of the anti-hydrolysis agent is 2 times an acid value equivalent of the polycondensation reactant, and an added amount of the second antioxidant is about 3,000 ppm. Finally, a polyester polyol product of Example 1 is obtained. In addition, a separation column top temperature of the reactor in Example 1 is controlled to be within a temperature range between 100° C. and 102° C., so as to reduce loss of diol during the reaction.

Example 2: Example 2 is substantially the same as Example 1, and their difference resides in that the added amount of the anti-hydrolysis agent is 3 times the acid value equivalent of the polycondensation reactant.

Example 3: Example 3 is substantially the same as Example 1, and their difference resides in that the anti-hydrolysis agent is a polymeric anti-hydrolysis agent, and its added amount is 2 times the acid value equivalent of the polycondensation reactant.

Example 4: Example 4 is substantially the same as Example 1, and their difference resides in that the raw material reactant includes 600 g of adipic acid (polyacid) and 480 g of 1,4-butanediol (polyol). Further, the molecular weight of the first antioxidant (polymeric antioxidant) is reduced from 3,000 to 2,000, and the amount of the first antioxidant is 0.1 g. The added amount of the anti-hydrolysis agent is 3 times the acid value equivalent of the polycondensation reactant.

Example 5: Example 5 is substantially the same as Example 1, and their difference resides in that the raw material reactant includes 600 g of adipic acid (polyacid) and 512 g of 1,4-butanediol (polyol). Further, the molecular weight of the first antioxidant (polymeric antioxidant) is reduced from 3,000 to 2,000, and the amount of the first antioxidant is 0.2 g. The added amount of the anti-hydrolysis agent is 2 times the acid value equivalent of the polycondensation reactant.

Comparative Example 1: Comparative Example 1 is substantially the same as Example 1, and their difference resides in that the raw material reactant includes 600 g of adipic acid (polyacid) and 460 g of 1,4-butanediol (polyol), and the first antioxidant is a low-molecular-weight phosphite ester (having a molecular weight of about 600 to 800). The anti-hydrolysis agent is added in an amount 4 times the acid value equivalent of the polycondensation reactant. The separation column top temperature of the reactor is 106° C. It should be noted that the antioxidant used in Comparative Example 1 is not a polymeric antioxidant, but a typical low-molecular-weight phosphite ester.

Comparative Example 2: Comparative Example 2 is substantially the same as Example 1, and their difference resides in that the raw material reactant includes 600 g of adipic acid (polyacid) and 460 g of 1,4-butanediol (polyol), and no anti-hydrolysis agent is added. The separation column top temperature of the reactor is 106° C.

Then, the polyester polyol prepared in each of the abovementioned examples and comparative examples is tested for its acid value, hue, hydrolysis resistance, high-temperature resistance and yellowing resistance. Relevant test methods are described below, and relevant test results are shown in Table 1.

Acid value: The acid value (unit: mg KOH/g) is tested according to a measurement method of ASTM D974. The acid value represents the number of milligrams of potassium hydroxide (KOH) required to neutralize 1 gram of oil.

Hue: The hue is tested with a color difference meter according to a test method of GB/T 5698-2001, in which a measured value ranges between 0 degrees and 360 degrees.

Hydrolysis resistance: A sample is stored in an oven at 150° C. for 7 days. Then, an acid value change rate (%) of the sample is observed, and its value is recorded (the lower, the better).

High-temperature resistance: A sample is stored in an oven at 150° C. for 7 days. Then, a color difference change rate (%) is detected with an online color difference meter (HunterLab STHT 0/30), and its value is recorded (the lower, the better).

Yellowing resistance: A sample is stored in an oven at 200° C. for 7 days. Then, a color difference change rate (%) is detected with an online color difference meter (HunterLab STHT 0/30), and its value is recorded (the lower, the better).

"feeding a first antioxidant and a raw material reactant that includes a polyacid and a polyol into a reactor, in which the first antioxidant is a polymeric antioxidant having a molecular weight of not less than 1,000 g/mol; subjecting the polyacid and the polyol to an esterification reaction in the reactor, so as to form an oligomer; and performing a polycondensation reaction on the oligomer in the reactor, so as to obtain a prepolymerization reactant," "during the prepolymerization reaction, the method including sampling and monitoring an acid value of the prepolymerization reactant," "when the acid value of the prepolymerization reactant reaches a first acid value, the method including adding an esterification reaction catalyst to the prepolymerization reactant, so as to start a polycondensation reaction and generate a polycondensation reactant that contains the polyester polyol, in which the first acid value is between 15 mg KOH/g and 35 mg KOH/g," "during the polycondensation reaction, the method including sampling and monitoring an acid value of the polycondensation reactant," and "when the acid value of the polycondensation reactant reaches a second acid value, the polycondensation reaction being terminated, in which the second acid value is not greater than 0.3 mg KOH/g," the finally-formed polyester polyol

TABLE 1

|  | Example 1 | Example 2 | Example 3 | Example 4 | Example 5 | Comparative Example 1 | Comparative Example 2 |
| --- | --- | --- | --- | --- | --- | --- | --- |
| Acid value (mg KOH/g) | 0.11 | 0.09 | 0.15 | 0.12 | 0.10 | 0.36 | 0.22 |
| Hue (degrees) | 20 | 20 | 25 | 20 | 15 | 60 | 30 |
| Hydrolysis resistance (%) | 0.17 | 0.11 | 0.26 | 0.14 | 0.12 | 0.52 | 0.79 |
| High-temperature resistance (%) | 30 | 25 | 40 | 30 | 20 | 70 | 50 |
| Yellowing resistance (%) | 50 | 40 | 60 | 50 | 30 | 100 | 80 |

From the abovementioned experimental results, it can be observed that Examples 1 to 5 have a lower acid value, a lower hue, a better hydrolysis resistance, a better high-temperature resistance, and a better yellowing resistance as compared with Comparative Examples 1 to 2. In Examples 1 to 5, due to the addition of the anti-hydrolysis agent and the high temperature (which is conducive to stabilizing the acid value), the hydrolysis resistance is significantly improved. The high-temperature resistance can also be effectively improved due to the stable acid value. Compared with other examples, Example 3 demonstrates that certain physical properties can still be maintained by adding the polymeric anti-hydrolysis agent. Due to structural factors, the polyester polyol having a low molecular weight has a relatively poor hydrolysis resistance and a relatively poor high-temperature resistance. However, this can be improved by increasing the amount of the anti-hydrolysis agent. The polymeric phosphorus-based antioxidant has a good water resistance for being not too hydrophilic, and the yellowing resistance can be improved by increasing its added amount.

Beneficial Effects of the Embodiments

In conclusion, in the method for producing the polyester polyol provided by the present disclosure, by virtue of can have an improved hydrolysis resistance. Accordingly, a molecular weight reduction and the occurrence of yellowing can be prevented. On the whole, the method for producing the polyester polyol provided by the present disclosure optimizes the raw material formula (which includes the addition of the anti-hydrolysis agent and the antioxidant) and the manufacturing parameters, such that the polyester polyol having the characteristics of a low acid value, a low hue, a high-temperature resistance, a yellowing resistance and a hydrolysis resistance can be generated. When the polyester polyol generated by the present disclosure is used for producing the thermoplastic polyurethane resin, the thermoplastic polyurethane resin can have a good reactivity. As such, by applying the thermoplastic polyurethane resin to product lamination (e.g., laminating a shoe material or fabric), the durability of the product can be significantly enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing a polyester polyol, comprising:

feeding a first antioxidant and a raw material reactant that includes a polyacid and a polyol into a reactor, and subjecting the polyacid and the polyol to an esterification reaction in the reactor, so as to form an oligomer; wherein the first antioxidant is a polymeric antioxidant having a molecular weight of not less than 1,000 g/mol; and performing a prepolymerization reaction on the oligomer in the reactor, so as to obtain a prepolymerization reactant;

wherein, during the prepolymerization reaction, the method includes sampling and monitoring an acid value of the prepolymerization reactant; wherein, when the acid value of the prepolymerization reactant reaches a first acid value, the method includes adding an esterification reaction catalyst to the prepolymerization reactant, so as to start a polycondensation reaction and generate a polycondensation reactant that contains the polyester polyol; wherein the first acid value is between 15 mg KOH/g and 35 mg KOH/g;

wherein, during the polycondensation reaction, the method includes sampling and monitoring an acid value of the polycondensation reactant; wherein, when the acid value of the polycondensation reactant reaches a second acid value, the polycondensation reaction is terminated; wherein the second acid value is not greater than 0.3 mg KOH/g.

2. The method according to claim 1, further comprising:

adding, after the acid value of the polycondensation reactant reaches the second acid value, an anti-hydrolysis agent and a second antioxidant to the polycondensation reactant, wherein the anti-hydrolysis agent is a monomeric anti-hydrolysis agent or a polymeric anti-hydrolysis agent, and an added amount of the anti-hydrolysis agent is between 1 times and 8 times an acid value equivalent of the polycondensation reactant; wherein the second antioxidant is a typical antioxidant having a molecular weight of not greater than 1,000 g/mol, and an added amount of the second antioxidant is between 50 ppm and 5,000 ppm.

3. The method according to claim 1, wherein, in the esterification reaction, the polyacid and the polyol carry out an oligomerization reaction at a first reaction temperature and at a first reaction pressure; wherein the first reaction temperature is between 140° C. and 230° C., and the first reaction pressure is between 740 torr and 780 torr.

4. The method according to claim 3, wherein the prepolymerization reaction is carried out under conditions that gas pumping and pressure reduction are performed on the reactor by a vacuum pump, such that a gas pressure in the reactor is reduced from the first reaction pressure to a second reaction pressure; wherein the prepolymerization reaction is carried out by heating to a second reaction temperature; wherein the second reaction temperature is between 200° C. and 250° C., and the second reaction pressure is between 20 torr and 70 torr.

5. The method according to claim 1, wherein a stirrer is disposed in the reactor to stir the polyacid and the polyol; wherein a top portion of the reactor is in spatial communication with a separation column, a condensing pipe that is in communication with an inside of the reactor is disposed at a tower top of the separation column, and a separation column top temperature of the tower top of the separation column is controlled to be within a temperature range between 95° C. and 105° C., such that a separated substance that is separated by the separation column and refluxed from the tower top is controlled to have a temperature within said temperature range.

6. The method according to claim 1, wherein, when an esterification rate of the esterification reaction is between 80% and 90%, the esterification reaction is terminated to complete preparation of the oligomer, and the oligomer is prepared to enter the subsequent prepolymerization reaction.

7. The method according to claim 2, wherein the polycondensation reaction further includes performing a dealcoholization operation on the polycondensation reactant at a dealcoholization pressure between 5 torr and 30 torr, so as to remove redundant polyol reaction monomers in the polycondensation reactant.

8. The method according to claim 2, wherein the anti-hydrolysis agent and the second antioxidant are added under a condition that the polycondensation reactant is reduced to a cooling temperature that is between 90° C. and 120° C.

9. The method according to claim 2, wherein the anti-hydrolysis agent is added to the polycondensation reactant before the second antioxidant is added to the polycondensation reactant.

10. The method according to claim 2, wherein the anti-hydrolysis agent includes a monomeric anti-hydrolysis agent that is side-modified with a long carbon chain, and the long carbon chain has a carbon chain length between C8 and C18.

* * * * *